(12) United States Patent
Lionti et al.

(10) Patent No.: US 9,665,751 B2
(45) Date of Patent: May 30, 2017

(54) METHOD FOR MANAGING A SET OF COMMUNICATING OBJECTS ALLOWING THE PROPAGATION OF A SIGNAL, NOTABLY A WAKE INSTRUCTION, BETWEEN SAID OBJECTS

(71) Applicant: COMMISSARIAT A L'ENERGIE ATOMIQUE ET AUX ENERGIES ALTERNATIVES, Paris (FR)

(72) Inventors: Rosolino Lionti, Seyssins (FR); Mélanie Descharles, Grenoble (FR); Hélène Lhermet, Meylan (FR); Thierry Thomas, Varces Alliers et Risset (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/692,438

(22) Filed: Apr. 21, 2015

(65) Prior Publication Data
US 2015/0302233 A1 Oct. 22, 2015

(30) Foreign Application Priority Data

Apr. 22, 2014 (FR) .................................... 14 53620

(51) Int. Cl.
*H04Q 5/22* (2006.01)
*G06K 7/10* (2006.01)
(Continued)

(52) U.S. Cl.
CPC ....... *G06K 7/10366* (2013.01); *G06Q 10/087* (2013.01); *H04B 5/0031* (2013.01);
(Continued)

(58) Field of Classification Search
CPC ....... H04W 4/02; H04W 12/06; H04W 48/02; H04W 4/00; H04W 88/06; G06K 7/10366;
(Continued)

(56) References Cited

U.S. PATENT DOCUMENTS 5,450,492 A * 9/1995 Hook .................. G06K 7/0008
340/10.2
5,640,151 A * 6/1997 Reis ........................ G01S 13/74
340/10.2
(Continued)

FOREIGN PATENT DOCUMENTS

EP 1 672 592 A2 6/2006
EP 1 672 592 A3 6/2006
(Continued)

OTHER PUBLICATIONS

French Search Report and Written Opinion dated Sep. 11, 2014, issued in corresponding French Patent Application No. FR 14 53620, with English translation and machine translation (31 pages).

*Primary Examiner* — Joseph Feild
*Assistant Examiner* — Rufus Point
(74) *Attorney, Agent, or Firm* — Westerman, Hattori, Daniels & Adrian, LLP

(57) ABSTRACT

The method for managing a set (100) of communicating objects (101), which are distributed such that each object (101) in the set (100) is neighboring at least one other object (101) in said set (100) so as to form a pair of neighboring objects that are capable of communicating with one another, has the following steps: activation (E1) of an initial object (101*a*) chosen among the objects (101) in the set (100); propagation (E2), from the activated initial object (101*a*), of a signal to each of the other objects in the set, said propagation being configured such that each of said other objects in the set has received, at the end of the step of propagation
(Continued)

(E2), said signal from at least one neighboring object belonging to said set at least once.

20 Claims, 3 Drawing Sheets

(51) Int. Cl.
*G06Q 10/08* (2012.01)
*H04B 5/00* (2006.01)

(52) U.S. Cl.
CPC ......... *H04B 5/0037* (2013.01); *H04B 5/0062* (2013.01); *H04B 5/0068* (2013.01)

(58) Field of Classification Search
CPC ... H04B 5/0031; H04B 5/0037; H04B 5/0062
See application file for complete search history.

(56) References Cited

U.S. PATENT DOCUMENTS

| | | | | |
|---|---|---|---|---|
| 5,774,876 A | * | 6/1998 | Woolley | G01S 5/0289 235/385 |
| 5,804,810 A | * | 9/1998 | Woolley | G01S 5/0289 235/375 |
| 5,892,441 A | * | 4/1999 | Woolley | G01S 5/0289 235/384 |
| 5,959,568 A | * | 9/1999 | Woolley | G01S 5/0289 235/385 |
| 5,973,613 A | * | 10/1999 | Reis | G01S 13/74 340/10.2 |
| 8,280,345 B2 | * | 10/2012 | Twitchell, Jr. | G06Q 10/08 340/5.7 |
| 2002/0119770 A1 | * | 8/2002 | Twitchell, Jr. | G06K 17/0029 455/426.1 |
| 2002/0175806 A1 | * | 11/2002 | Marneweck | G06K 7/0008 340/10.33 |
| 2004/0082296 A1 | * | 4/2004 | Twitchell, Jr. | G06K 7/10108 455/41.2 |
| 2005/0093703 A1 | * | 5/2005 | Twitchell, Jr. | H04L 69/329 340/572.8 |
| 2006/0055552 A1 | * | 3/2006 | Chung | B60R 25/00 340/686.1 |
| 2006/0103534 A1 | * | 5/2006 | Arms | E01F 13/12 340/572.1 |
| 2006/0145813 A1 | | 7/2006 | Haller et al. | |
| 2007/0085688 A1 | * | 4/2007 | Zhu | G06Q 10/08 340/572.8 |
| 2009/0072951 A1 | | 3/2009 | Alberth, Jr. et al. | |
| 2010/0067420 A1 | * | 3/2010 | Twitchell, Jr. | G06Q 10/08 370/311 |
| 2010/0330930 A1 | * | 12/2010 | Twitchell | H04L 12/12 455/73 |
| 2012/0133490 A1 | * | 5/2012 | Downie | G06K 19/0717 340/10.1 |
| 2012/0155349 A1 | * | 6/2012 | Bajic | H04W 4/008 370/311 |
| 2012/0242481 A1 | * | 9/2012 | Gernandt | G06K 19/0705 340/539.13 |
| 2012/0306284 A1 | * | 12/2012 | Lee | H02J 17/00 307/104 |
| 2013/0234831 A1 | | 9/2013 | Sabesan et al. | |
| 2014/0240088 A1 | * | 8/2014 | Robinette | G08B 13/1427 340/5.61 |

FOREIGN PATENT DOCUMENTS

| | | |
|---|---|---|
| WO | 2011/135329 A1 | 11/2011 |
| WO | 2012/102600 A1 | 8/2012 |
| WO | 2014/037888 A1 | 3/2014 |

* cited by examiner

METHOD FOR MANAGING A SET OF COMMUNICATING OBJECTS ALLOWING THE PROPAGATION OF A SIGNAL, NOTABLY A WAKE INSTRUCTION, BETWEEN SAID OBJECTS

TECHNICAL FIELD OF THE INVENTION

The invention concerns the field of communications between objects, notably between stored objects.

The object of the invention is more particularly a method for managing a set of communicating objects.

PRIOR ART

Looking for an object in a large stock of objects can be a headache. For this reason, specific methods for locating (an) object(s) in a set of objects have been developed.

The most widely used approach for radio location of an object in a set is based on the estimation of distances and requires prior geographical knowledge of points of reference. The main associated measurement techniques are attenuation measurement for the intensity of a transmitted electromagnetic wave, measurement of the time of arrival of said electromagnetic wave or of the phase of the received electromagnetic wave. These techniques are not very precise owing to the various phenomena affecting the propagation of electromagnetic waves in a real environment. Depending on the choice of communication technology implemented, the power consumed for locating an object can prove to be high.

It is therefore necessary to develop a communication strategy between objects that allows compensation for the consequences of a difficult propagation environment for electromagnetic waves.

OBJECT OF THE INVENTION

The aim of the present invention is to propose a solution that overcomes all or some of the drawbacks listed above.

This aim is achieved by a method for managing a set of communicating objects that are distributed such that each object in the set is neighbouring at least one other object in said set so as to form a pair of neighbouring objects that are capable of communicating with one another, said method having the following steps:
  activation of an initial object chosen among the objects in the set,
  propagation, from the activated initial object, of a signal to each of the other objects in the set, said propagation being configured such that each of said other objects in the set has received, at the end of the propagation step, said signal from at least one neighbouring object belonging to said set at least once.

Preferably, the set of objects is configured so as to adopt a standby configuration in which all the objects in the set are in a passive state and a wake configuration in which all the objects in the set are in an active state, the change from the standby configuration to the wake configuration being implemented by the step of propagation, said propagated signal then being a wake instruction.

Preferably, each of the objects in the set being in a passive state, the change from the passive state to the active state of the initial object is made by the step of activation causing the supply of power to at least one reader of the initial object and the transmission of an electromagnetic field by said at least one reader with the aim of transmitting the wake instruction to a corresponding neighbouring object, and the change from the passive state to the active state of each of the other objects in the set is made by a step of supply of power to a radio tag of said object in the passive state, said step being caused by an electromagnetic field transmitted by a reader of a neighbouring object in the active state, said supply of power to the radio tag of said object in the passive state causing:
  the setup of a communication link between said reader of the neighbouring object in the active state and said radio tag of said object in the passive state,
  the transmission, via the communication link that has been set up, of the wake instruction by said reader of the neighbouring object in the active state,
  the reception, by said radio tag of said object in the passive state, of said wake instruction causing the implementation of a step of supply of power to at least one reader of said object in the passive state, its change to the active state, and the transmission, by said at least one powered reader, of an electromagnetic field with the aim of transmitting said wake instruction.

According to one embodiment, each object in the set has a plurality of communicating elements, each pair of neighbouring objects having two objects that are capable of communicating directly with one another solely by means of a single communicating element of one of the objects in the pair of neighbouring objects and a single communicating element of the other of the objects in the pair of neighbouring objects, and the step of propagation of said signal has a step of direct communication of the signal between said two objects in one and the same pair of neighbouring objects.

By way of example, each communicating element has a reader and a radio tag, the step of supply of power to a radio tag of one of the communicating elements of an object by a neighbouring object causing, in the event of reception of the wake instruction by said powered radio tag, the implementation of the supply of power to each of the readers of the other communicating elements of said object.

According to an improvement, the method has a step of generation of a neighbourhood inventory for the objects in the set from data generated by each of the objects in the set following reception of said signal, said inventory having, for each object in the set, a list comprising information relating to each object that is neighbouring said object.

Moreover, the method can have a step of use of the data from the neighbourhood inventory to generate mapping for the spatial arrangement of the objects in the set in relation to one another.

In particular, the method can have a step of generation, for each object in the set, of a communication path between the initial object and said object using the communication capabilities of said initial object and/or of at least one intermediate object situated on said communication path.

According to one implementation, the method has a step of interrogation of an object chosen among the set, the step of interrogation comprising the following steps:
  transmission of an interrogation request from the initial object, said transmitted request propagating along the corresponding communication path until it reaches the chosen object,
  response to the request, said response being transmitted by the chosen object and propagating along the corresponding communication path as far as the initial object.

The step of generation of the inventory can involve a first object in the set, notably after having propagated the signal to each neighbouring object, drawing up a list comprising the information relating to each object that is neighbouring said first object.

The step of generation of the inventory can also have a step of enrichment of the inventory in which a second object transmits its list, comprising information relating to each neighbouring object, to said first object, said first and second objects being neighbours, said first object enriching the inventory by including its own list of neighbouring objects that is associated with its own identifier and the list from the second object that is associated with the identifier of said second object.

Alternatively, the step of generation of the inventory can have a step of enrichment of the inventory in which the first object transmits its list to a second object, the second object being the one that transmitted said signal to it.

The invention also relates to a storage installation comprising a set of communicating objects that are distributed such that each object in the set of objects is neighbouring at least one other object in said set so as to form a pair of neighbouring objects that are capable of communicating with one another, said installation comprising elements that are configured so as to implement the method as described.

The invention also relates to a communicating object intended to be stored in the installation, said communicating object having a plurality of communicating elements that are each disposed on different faces of the communicating object, and each communicating element being configured so as to receive a signal and to transmit it to the other communicating elements, said other communicating elements being configured so as to propagate, following reception of said transmitted signal, said received signal to the outside of said communicating object.

Preferably, within the framework of the communicating object, each communicating element has:
 a reader configured so as to transmit an electromagnetic field allowing wireless powering of a radio tag of another communicating object, and
 a radio tag configured so as to be powered by an electromagnetic field transmitted by a reader of another communicating object.

BRIEF DESCRIPTION OF THE DRAWINGS

Other advantages and features will emerge more clearly from the description that follows for particular embodiments of the invention that are provided by way of nonlimiting example and shown in the appended drawings, in which.

DESCRIPTION OF PREFERRED MODES OF THE INVENTION

The method described below differs from the prior art in that each object in the set of objects is capable of forming a relay for propagating a signal in the direction of its neighbouring object or each of its neighbouring objects. In particular, said propagated signal may be a wake instruction. It will therefore be understood that the signal can be understood as a sign, a warning, an announcement capable of transmitting an instruction, an order or a command. In other words, the signal may be a wake instruction transmitted by a communication link, notably a radio-frequency communication link, also allowing a remote supply of power to part of a communication element of the neighbouring object.

Figure 1:
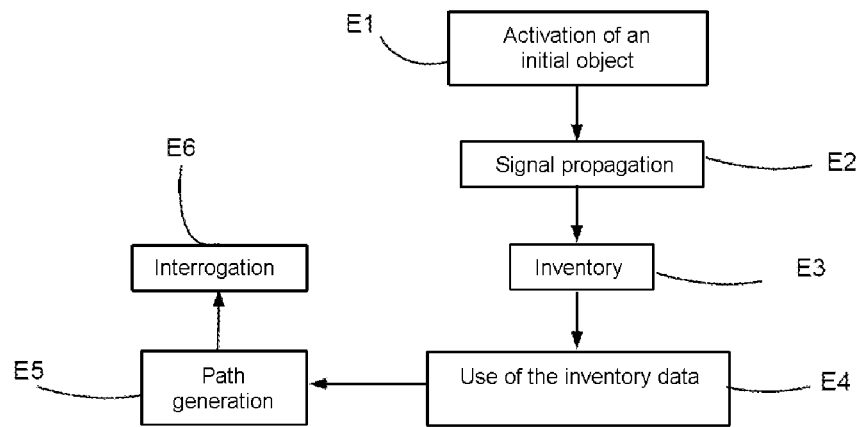
FIG. 1 is a diagram showing various steps in the management method according to a particular embodiment of the invention.
Figure 2:
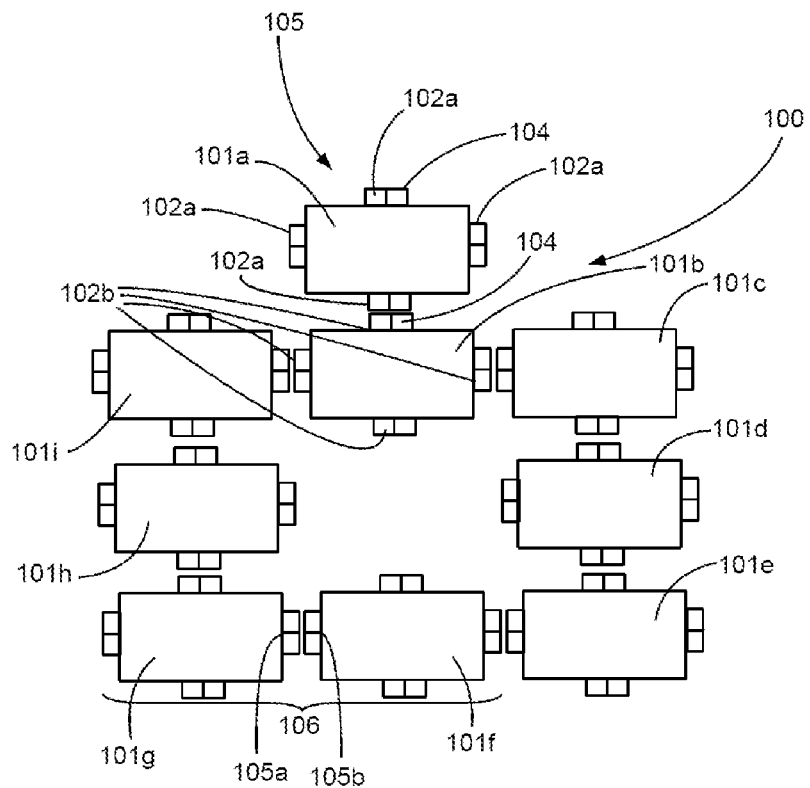
FIG. 2 illustrates a set of objects.

As illustrated in FIGS. 1 and 2, the management method allows management of a set 100 of communicating objects 101 (denoted by a to i for the purposes of FIG. 2) that are distributed such that each object 101 in the set of objects is neighbouring at least one other object in said set 100 so as to form a pair of neighbouring objects that are capable of communicating with one another. In other words, the set of objects may be seen as a plurality of pairs of separate neighbouring objects. One and the same object in the set can belong to a plurality of different pairs of neighbouring objects. In the example of FIG. 2, the neighbours to the object 101*b* are the objects 101*a*, 101*c*, 101*i*, thus forming the three object pairs (101*b*, 101*a*); (101*b*, 101*c*); (101*b*, 101*i*).

A "neighbouring object" is understood to mean an object that is adjacent to another object. Two neighbouring objects are adjacent to one another. In other words, an object will be neighbouring another object when it is directly placed beside another object without the interposition of a third object and these two neighbouring objects can communicate directly with one another. More particularly, two neighbouring objects can set up a direct wireless communication link between them, this communication link particularly allowing transmission of the signal to be propagated.

The method has an activation step E1 for an initial object 101*a* chosen among the objects 101 in the set 100 of objects. The initial object 101*a* is generally an accessible object in the set of objects, and therefore situated on the outer periphery of the set of objects.

Moreover, the method has a step of propagation E2, from the activated initial object 101*a*, of a signal to each of the other objects in the set. Said set of propagation E2 is configured such that each of said other objects in the set has received, at the end of the step of propagation E2, said signal from at least one neighbouring object belonging to said set at least once. In this case, it will be understood that the propagation can be initiated by the initial object 101*a* by transmitting the signal to each neighbouring object 101*b* for said initial object 101*a* (in the example in FIG. 2, the object 101*a* has a single neighbour constituted by the object 101*b*). From then on, each object in the set that has received the signal can transmit it again to at least one neighbour, and preferably to each of its neighbours. Preferably, each object in the set that has received the signal transmits it to each other object neighbouring itself that is separate from the neighbouring object from which it has received said signal. In the example of FIG. 2, the object 101*b* transmits the signal, so that it is propagated in the loop formed by the objects 101*b*, 101*c*, 101*d*, 101*e*, 101*f*, 101*g*, 101*h* and 101*i*, to its two neighbours 101*i* and 101*c*.

Preferably, each object transmits the signal to its neighbours only a single time. That is to say that if an object receives the same signal from two different neighbouring objects, it will propagate it to its other neighbouring object(s) only a single time.

The result of this step of propagation E2 is that it is possible to address any object in the set whatever the environment. By way of example, even if the object is a metal box covered with other metal boxes forming the other objects in the set, the object-to-object propagation will allow all of the metal boxes to be accessed.

In order to avoid any erroneous propagation, the initial object 101*a* can be activated by an authenticated exchange between said initial object and an activation device. Thus, the initial object 101*a* will not propagate the signal if the activation device is not deemed authorized.

Preferably, to avoid any piracy, communications between two neighbouring objects are authenticated and/or encrypted.

It will be understood from what has been stated above that each of the objects 101 in the set 100 is equipped with communication means 105. This therefore results in problems concerning the supply of power to the communication means. The reason is that if the communication means, which are generally each powered by an autonomous battery, always stay tuned, this will result in rapid discharge and therefore in a need to change the batteries at regular intervals.

In this respect, an improvement has been developed for the method that allows this type of problem to be overcome. Thus, the set of objects 100 is advantageously configured so as to adopt a standby configuration in which all the objects 101 in the set 100 are in a passive state and a wake configuration in which all the objects 101 in the set 100 are in an active state, the change from the standby configuration to the wake configuration being implemented by the step of propagation E2, said propagated signal then being a wake instruction.

It will be understood from what has been stated above that, in a passive state, an object consumes less electric power than in an active state. Preferably, in its passive state, all the power-consuming elements are off so as no longer to consume anything. In other words, in passive mode, the power consumption of an object is zero. Preferably, each object 101 in the set 100 has a battery providing electric power in the active state, notably for communication means of said object, and not providing any electric power in the passive state. The battery has been given by way of example in this case, and can be replaced by any type of power source.

Preferably, the step of activation E1 of the initial object 101*a* has a step of supply of power to at least one reader 102*a* of the initial object (notably by the aforementioned battery of the object), said initial object 101*a* then changing from a passive state to an active state, and a step of transmission of an electromagnetic field by each reader 102*a* of the initial object so as to set up radio-frequency communication with the aim of transmitting the signal to be propagated in the direction of a neighbouring object 101*b* for said initial object 101*a*. The electromagnetic field transmitted by the reader 102*a* of the initial object causes a radio tag 104 (FIG. 2) of said neighbouring object to be powered, thus creating a communication link, and the transmission, via said communication link, of the signal to be propagated. The reception, by the radio tag, of the signal to be propagated triggers the supply of power to at least one reader 102*b* of the neighbouring object 101*b*, said neighbouring object 101*b* then changing from a passive state to an active state and so on.

An "electromagnetic field" is preferably understood to mean an electromagnetic wave.

In other words, except for the initial object whose change from the passive state to the active state can be made by the activation device, each other object 101 in the set 100 is configured so as to change from the passive state to the active state following a step of reception of a wake instruction by a radio tag of said other object, which wake instruction is transmitted by a neighbouring object. Each step of reception of a wake instruction results from the propagation of the signal between two neighbouring objects.

Thus, the initial object 101*a* can be activated by a reader that is outside the set of objects (forming the aforementioned activation device) and that voluntarily generates an electromagnetic field supplying power to a radio tag 104 of the initial object and that transmits, via the communication link between the outer reader and the powered radio tag of the initial object 101*a*, the signal to be propagated so as to wake the initial object 101*a* and implement the step of supply of power to said at least one reader 102*a* of the initial object 101*a*.

The concepts of "reader" and "radio tag" are intended to be taken in the broad sense here as providing the general functions of radio identification, for example of RFID (Radio-Frequency Identification) type and notably of near field communication or NFC type. Thus, a reader may be a device that is capable of transmitting radio-frequency waves, that is to say an electromagnetic field, which will activate a radio tag by providing it, at short range, with power that it requires in order to be powered. The radio tag is a device generally comprising a chip and an antenna connected to the chip, and it does not require any power source other than that provided by the reader at the time of interrogation (transmission of the signal). The radio identification described above may be of the type used by contactless-card person identification systems (for example systems based on the ISO14443 and ISO015693 standards at a frequency of 13.56 MHz) and "RFID"-tag object identification systems (for example systems based on the ISO15693 and IS018000-3 standards at the frequency of 13.56 MHz and the IS018000-2 standard at a frequency lower than 135 kHz).

According to a particular embodiment, each of the objects 101 in the set 100 being in a passive state, the change from the passive state to the active state of the initial object 101*a* is made by the step of activation E1 causing the supply of power to at least one reader 102*a* (preferably to each reader) of the initial object 101*a* (notably by a battery of the initial object) and the transmission of an electromagnetic field by said at least one (preferably each) reader 102*a* with the aim of transmitting the wake instruction to a corresponding neighbouring object. The change from the passive state to the active state of each of the other objects 101 in the set 100 is made by a step of supply of power to a radio tag of said object in the passive state, said step being caused by an electromagnetic field transmitted by a reader of a neighbouring object in the active state, said supply of power to the radio tag of said object in the passive state causing:

the setup of a communication link between said reader of the neighbouring object in the active state and said radio tag of said object in the passive state, the transmission, via the communication link that has been set up, of the wake instruction by said reader of the neighbouring object in the active state, the reception, by the radio tag of said object in the passive state, of said wake instruction causing the implementation of a step of supply of power to at least (preferably each) one reader of said object in the passive state (notably by a battery of said passive object), its change to the active state, and the transmission, by said at least one powered reader (preferably each), of an electromagnetic field with the aim of transmitting the wake instruction. In this case, it is possible to distinguish the supply of power to the radio tag, which is provided remotely (remote powering) by the electromagnetic field transmitted by the corresponding neighbouring object in the active state, from the supply of power to the reader(s) of the object, which is provided by a power source (battery) belonging to said object.

Preferably, when said radio tag of said object in the passive state receives said wake instruction, said radio tag authenticates the wake instruction with the aim of verifying that it is indeed an authorized wake instruction, and if the wake instruction is authenticated (that is to say authorized) then it causes the implementation of the step of supply of power to at least (preferably each) one reader of said object in the passive state (notably by a battery of said passive object), its change to the active state and the transmission, by said at least one powered reader (preferably each), of an electromagnetic field with the aim of transmitting the wake instruction. In particular, if the wake instruction is not authenticated (that is to say that it is not authorized), then the radio tag that has received said wake instruction does not propagate it and said object in the passive state remains in its passive state. Moreover, the step of activation can also involve authentication in the sense that if the activation is not authenticated then the initial object does not change to the active state and if the activation is authenticated then the initial object changes from the passive state to the active state causing all that has been mentioned previously.

Generally, the process of authentication will not be described in details at this juncture, and a person skilled in the art will be able to apply his knowledge at this juncture in order to adapt the authentication to the method described.

According to the present specification, the authentication may have a broad meaning and may have different level. In a first level, it can be a simple check that the instruction is a wake up instruction (for example the code associated with the wake instruction is really a wake code defined and known by the system). In a second level, a check of this wake instruction can be performed to check if this is not a false due to transmission errors: for example a calculated value according to a known calculated method may be added, to the code associated to the wake up instruction, into the transmitted data, it can be "CRC" (for Cyclic Redundancy check) added at the end of a data frame to check if these data are not corrupted during transmission. In a third level, the authentication mays be the highest, at this level the authenticity of the wake instruction can be checked: this can be performed by an identity check of a sending unit of the instruction, for example by certificate exchange.

Figure 3:
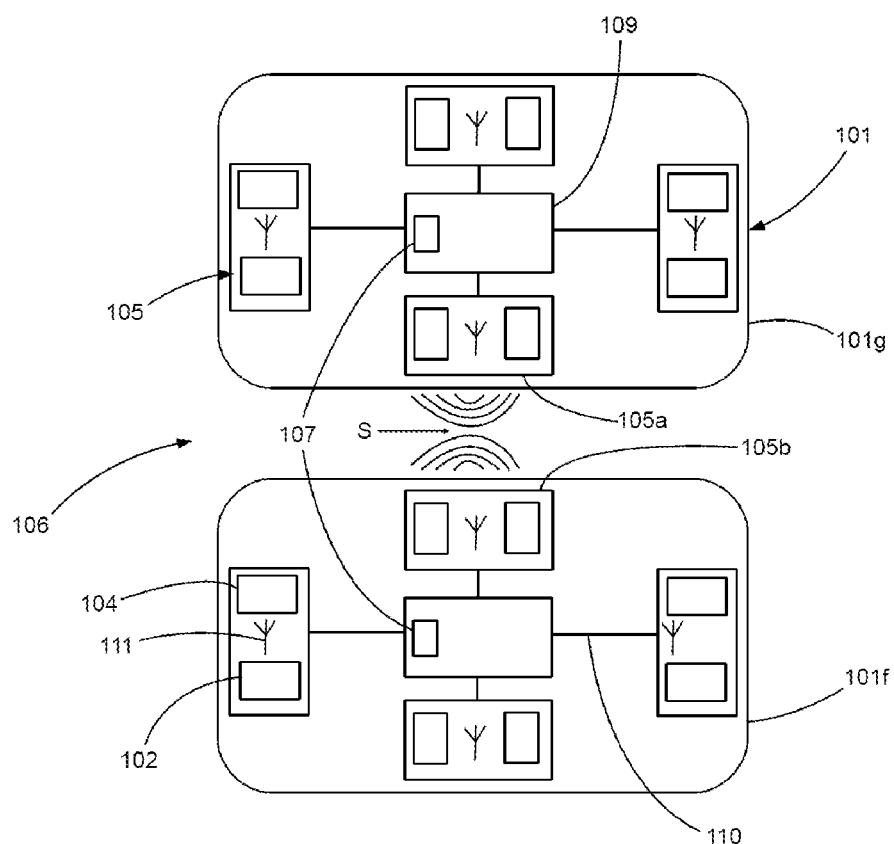
FIG. 3 illustrates two neighbouring objects in detail.

The result of the statements above is that each of the objects 101 in the set 100 is advantageously equipped with suitable communication means. In particular, as illustrated in FIG. 3, each object 101 in the set has a plurality of communicating elements 105, each pair of neighbouring objects 106 having two objects that are capable of communicating directly with one another solely by means of a single communicating element 105a of one of the objects 101g in the pair of neighbouring objects and a single communicating element 105b of the other of the objects 101f in the pair of neighbouring objects (FIG. 2), and the step of propagation E2 of said signal has a step of direct communication of the signal S between said two objects 101f, 101g in one and the same pair 106 of neighbouring objects.

It will be understood that one and the same object in the set, if it has a plurality of neighbours, will be capable of receiving the signal to be propagated from each of its neighbours. This allows the method a certain degree of robustness even in the event of failure of a communicating element 105 since the object is "seen" by at least two neighbouring objects.

Moreover, a communicating object 101 may be such that it has redundancy for each of its communicating elements 105. This allows further improvement of the robustness of the method.

In particular, each communicating element has (FIG. 3) a reader 102 and a radio tag 104, the step of supply of power to a radio tag of one of the communicating elements of an object by a neighbouring object (notably by the corresponding reader of said neighbouring object) causing, in the event of reception of the wake instruction by said powered radio tag, and if need be only if the wake instruction is authenticated (that is to say considered to be valid), the implementation of the supply of power to each of the readers of the other communicating elements of said object, notably by the battery 107 of said object. In particular, once powered, the readers of the other communicating elements transmit said signal in the manner described previously.

In FIG. 3, which illustrates a particular example of the communication means of an object, the communication means of an object can have a central unit 109 that centralizes the intelligence of the object. This central unit 109 contains the main functions for solving the stated problem, and can also contain application functions such as recording of data, computation, actuation, etc. The central unit 109 has the battery 107 that it uses when a wake command is activated by one of the communicating elements 105, notably on reception of a wake instruction by said communicating element 105. The communicating elements 105 are positioned at the surface of the object in question, at precise points whose location is known to the central unit 109 (the positions are related to the corresponding object). Moreover, each object has links 110, preferably wired links, connecting the central unit 109 to the communicating elements 105. The links are preferably wired links so as to limit the power required for transmitting the data and to facilitate waking of the object in question (change from the passive state to the active state). The communicating elements 105 are, as mentioned previously, provided with near field communication means of NFC (Near Field Communication) type allowing a reception function of "unpowered transponder" type and a "transponder reader" function, said transponder reader being powered by the central unit 109 or by a dedicated power source, providing the communication and notably the transmission of the wake instruction. The disposition of the objects in the set among one another is such that at least one communicating element of an object is within communication range of a communicating element of another object so as to form the pair of neighbouring objects mentioned previously.

Preferably, as mentioned, each communicating element 105 of a given object is within communication range of a single other communicating element of an object that is neighbouring said given object. Depending on the type of reader used, it is not impossible for the reader of a communicating element to be able to see a plurality of radio tags at the same time, in this case, before propagation of the signal, notably the wake signal, the reader adapts its operation, notably by adapting the level of the transmission of the electromagnetic field, so as then to see only a single radio tag that is then considered to belong to a neighbouring object. In other words, according to a particular embodiment, a reader may be such that it has a configuration in which it can power, via the electromagnetic field that it transmits, only a single radio tag.

In FIG. 3, each communicating element 105 can have an additional wireless link 111, for example at the frequency 868 MHz, in order to allow high-speed communication with a central data retrieval body outside the set of objects.

More generally, a communicating object 101 that is intended to be used within the scope of the method as described has a plurality of communicating elements 105 that are each disposed on different faces of the communicating object. Each communicating element 105 is configured so as to receive the signal (the signal to be propagated) and to transmit it to the other communicating elements 105 (of said communicating object), said other communicating elements 105 being configured so as to propagate, following reception of said transmitted signal, said received signal to the outside of said communicating object 101. More particularly, each communicating element has a reader 102 that is configured so as to transmit an electromagnetic field allowing the wireless powering of a radio tag of another communicating object 105 and a radio tag 104 that is configured so as to be powered by an electromagnetic field transmitted by a reader of another communicating object. The radio tag is moreover configured such that its outer supply of power by the electromagnetic field causes, following reception of the signal, a supply of power to one or more readers of said object by a battery of said object so as to transmit the received signal to the outside.

In some instances of use, the disposition of the objects 101 in the set in relation to one another is not known. In this respect, there is a need to generate an inventory for the objects, notably with the aim of determining whether the set of objects contains a sought object and/or the spatial distribution of the objects in relation to one another.

In this respect, the method can advantageously have a step of generation of a neighborhood inventory E3 (FIG. 1) for the objects 101 in the set from data generated by each of the objects 101 in the set 100 following reception of said signal, said inventory having, for each object in the set, a list comprising information relating to each object that is neighbouring said object.

By way of example, the step of generation of the inventory E3 involves a first object in the set, notably after having propagated the signal to each neighbouring object (preferably except for the one that has transmitted the signal to it), drawing up a list comprising information relating to each object that is neighbouring said first object. The list then has information relating to one or more neighbouring objects. In other words, when the first object has propagated the signal (preferably the wake instruction) to each neighbouring object, the latter is able to know which is its sole neighbour or which are all its neighbours.

Although not described in detail, each object 101 in the set 100 is preferably associated with an identifier number that is unique to it, and each communicating element 105 of an object 101 is preferably associated with a unique sequence number for one and the same object, this/these number(s) being able to be read by a neighbouring object. Thus, following propagation of the signal, the first object can read the identifier of each neighbouring object and associate each read identifier with a relative position of said neighbouring object in relation to said first object (notably by virtue of the association of the sequence numbers of the communicating objects 105 that have been related for the propagation of the signal). It will then be understood that, at the end of propagation of the signal, each object in the set knows its neighbouring object(s), and is capable of locating it/them in relation to itself.

If the object can have a plurality of faces that are each intended to be opposite an associated neighbouring object and equipped with a communicating element, the aforementioned list of a first object can have at least one, or a plurality of, recording(s) comprising the following data: the identifier of a neighbouring object, the sequence number of the face of the first object, the sequence number of the face of the neighbouring object corresponding to the relating of the first object to the neighbouring object. Generally, for each first object, the plurality of recordings has as many recordings as the first object has neighbouring objects.

Each object in the set, once it has compiled its list, is able to transmit said list to an outer management element from the set of objects, notably by using an additional one of its wireless links. Alternatively, the list of each object is transmitted to the initial object with the aim of being retrieved by the outer management element. The inventory list for the neighborhood of an object is transmitted with the accompaniment of the identifier of said object.

Preferably, the step of generation of the inventory E3 has a step of enrichment of the inventory in which a second object that is neighbouring the first object transmits its list, comprising information relating to each neighbouring object, to said first object, said first and second objects being neighbours, said first object enriching the inventory by including its own list of neighbouring objects that is associated with its own identifier and the list of neighbouring objects from the second object that is associated with the identifier of said second object.

Alternatively, the step of generation E3 of the inventory has a step of enrichment of the inventory in which the first object transmits its list to a second object, the second object being the one that transmitted said signal to it. It is possible to foresee that the first object transmits its list solely to the second object if the latter is the first to have sent it the signal, or alternatively the first object can transmit its list to all the objects that have sent it to the signal. Moreover, advantageously when the second object, which is not the initial object, receives an inventory list from the first object (the inventory list of the first object or the inventory list of another object or an enriched inventory list), it transmits it to a third object that has transmitted said signal to it. It is possible for foresee that the second object sends its list only to the third object (the first to have sent the signal to it), or to all the objects that have transmitted the signal to it. It will be understood that, in this example, each list will finally return to the initial object, following a path that is opposite to the propagation. The initial object being on the outer periphery of the set of objects, the set of lists will easily be able to be retrieved for analysis.

Figure 4:
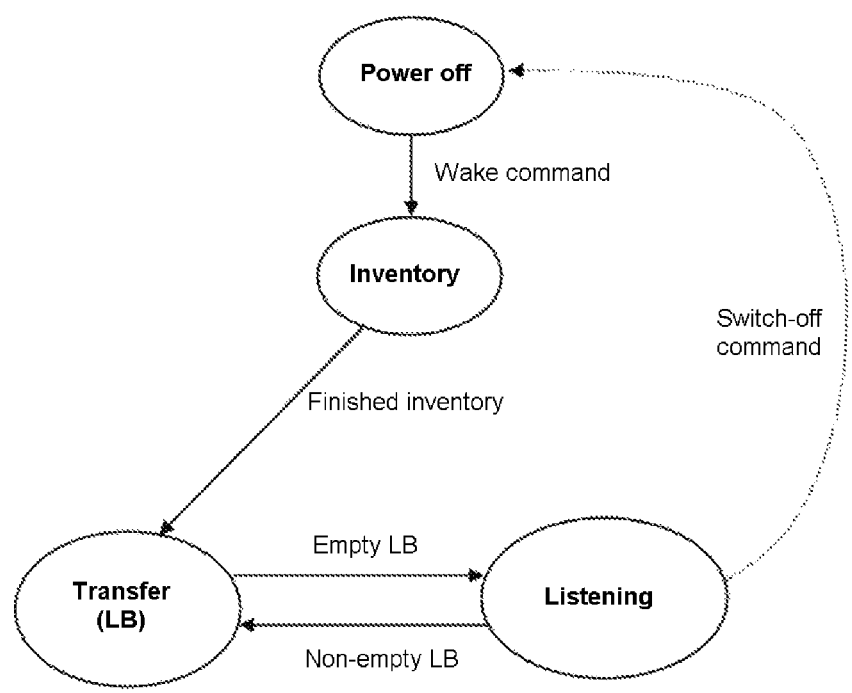
FIG. 4 is a particular example of a state diagram for each object in the set of objects.

Alternatively, it is possible to describe the management method by using a state and transition diagram that can be applied to each object in the set. This diagram is illustrated in FIG. 4 and has the following states: "power off", "inventory", "transfer", "listening".

The "power off" state is similar to the passive state described above. In this state, the associated object is switched off and only the radio tags can be remotely powered.

The communicating object changes to the "Inventory" state following reception of a wake command by a radio tag. This wake command corresponds to the propagated signal described above. In this state, the object propagates this wake command to the objects that are neighbouring preferably only those in the "Power off" state, and takes an inventory of its proximity. Two blocks of information are set up: a local use block containing particularly the information relating to the point of entry of the wake command (the number of the corresponding communicating element, etc.) and a list of information relating to the neighborhood (the identifiers of the neighbouring objects if present in association with the numbers of communicating elements "facing one another", or the object absence information in association with the communicating element number in question). When the list of information relating to the proximity has been drawn up, this block of information, labelled with the identifier of the object, is placed in a "letterbox" (LB) and the object changes to the "Transfer" state.

In the "Transfer" state, the object receives the content of an LB of a neighbouring object (associated with a different communicating element from the one that has received the wake command), and it adds it to the content of its LB or transmits the content of its LB to the neighbouring object corresponding to the communicating element that has received the wake command. When its LB is empty, the object changes to the "Listening" state.

In the "Listening" state, the object is capable of receiving the content of an LB of a neighbouring object (associated with a different communicating element from the one that has received the wake command) and adds it to the content of its LB (initially empty), the object then changes to the "Transfer" state. In this "listening" state, the object can also receive a command from the communicating element that has received the wake command, for example a switch-off command that causes the object to be switched off. By way of example, the switch-off command is sent from the initial object once the content of the LB of each object has reached the initial object.

When all the objects are in the Listening state, and if the external reader is no longer receiving LB content, it can be decided that, after an agreed waiting time, all the objects 101 in the set 100 have transmitted their inventory list.

According to one embodiment of the invention, the method has a step of use E4 (FIG. 1) of the data from the neighbourhood inventory in order to generate mapping for the spatial arrangement of the objects 101 in the set 100 in relation to one another. This mapping can advantageously be used to find an object 101 easily in the set 100 of objects. The use of the lists described above allows reconstruction of the relative positions of each of the objects 101 in relation to all the others.

According to an improvement, the method has a step of generation E5 (FIG. 1), for each object 101 in the set 100, of a communication path between the initial object and said object using the communication capabilities of said initial object and/or of at least one intermediate object (or even a plurality of intermediate objects) situated on said communication path.

This communication path can advantageously be determined from the generated mapping. By way of example, the communication path may be such that it allows access to an object chosen from an initial object by going through only a minimal number of intermediate objects so as to limit the power consumption of the objects 101 in the set 100. Preferably, the optimum route on the communication path is worked out by the external reader that has the overall distribution of the objects in relation to one another. Owing to the proximity of the adjacent objects, the radio links between objects are set up at very low power, which allows a reduction in the consumption and consequently extension of the period of use. Furthermore, all the links can be set up simultaneously, which ensures an optimum data rate.

It will be understood from what has been stated above that once the mapping and the communication paths are known, it is simpler to interrogate an object specifically. In other words, the method can have a step of interrogation E6 (FIG. 1) of an object 101 chosen among the set of objects 100, the step of interrogation E6 comprising: a step of transmission of an interrogation request from the initial object, said transmitted request propagating along the corresponding communication path until it reaches the chosen object, and a step of response to the request, said response being transmitted by the chosen object and propagating along the corresponding communication path as far as the initial object.

In fact, the request may have the identifier of the chosen object and the identifiers of each intermediate object through which the request needs to pass in order to arrive at the chosen object. Thus, if wishing to communicate with a chosen object in the set while all the objects are in a passive state, an initial object (which may be the same or different from the one chosen in the propagation step described above) is woken, and the request is transmitted such that only the intermediate object(s) change from the passive state to the active state up until the chosen object is woken.

Each object 101 in the set 100 may have a container provided with a content and can provide data that are representative of the content. This step of retrieval of the data can be implemented by the step of interrogation E6 described above.

In addition to data that are representative of the content, it is likewise possible to foresee the transfer, to the initial object, of data collected from each of the objects, for example arising from sensors integrated in these objects (for example in order to obtain information about the history of the storage using shock sensors, etc.).

It will then be understood that each object can have a container formed by a box, for example. The box may be metallic and, in this case, the method as described allows propagation difficulties owing to the metal in the boxes to be overcome.

These boxes can contain any type of content, such as foodstuffs, third-party devices to be stored, etc.

Thus, the method described above can be used for storing any type of object.

In this respect, the invention also relates to a storage installation comprising a set of communicating objects that are distributed such that each object in the set of objects is neighbouring at least one other object in said set so as to form a pair of neighbouring objects that are capable of communicating with one another, said installation comprising elements that are configured so as to implement the method as described previously. Notably, each element of the installation can be configured so as to perform an associated corresponding step as described above.

The communicating object described above may be intended to be stored in the installation as described.

The invention claimed is:

1. A method for managing a set of communicating objects that are distributed so that each object in the set is neighbouring at least one other object in said set so as to form a pair of neighbouring objects that are configured so as to communicate with one another, wherein, in each pair of neighbouring objects, the objects of the pair are directly placed beside one another without interposition of another of said objects, said method comprising:
activating an initial object chosen among the objects in the set, and
propagating, from the activated initial object, a signal to each of the other objects in the set, said propagation being configured so that each of said other objects in the set has received, at the end of the propagating, said signal from at least one neighbouring object belonging to said set at least once,
wherein the propagated signal is a wake instruction,
wherein, each of the objects in the set being in a passive state, a change from a passive state to an active state of the initial object is performed by the activating causing a supply of power to at least one reader of the initial object and a transmission of an electromagnetic field by said at least one reader for transmitting the wake instruction to a corresponding neighbouring object, and wherein the change from a passive state to an active state of each of the other objects in the set is performed by supplying power to a radio tag of said object in the passive state, said supply of power being caused by an electromagnetic field transmitted by a reader of a neighbouring object in the active state, said supply of power to the radio tag of said object in the passive state causing:

a setup of a communication link between said reader of the neighbouring object in the active state and said radio tag of said object in the passive state, a transmission, via the communication link that has been set up, of the wake instruction by said reader of the neighbouring object in the active state, and a reception, by said radio tag of said object in the passive state, of said wake instruction causing the implementation of supplying power to at least one reader of said object in the passive state, its change to the active state, and a transmission, by said at least one powered reader, of an electromagnetic field with the aim of transmitting said wake instruction.

2. The method according to claim 1, wherein the set of objects is configured to adopt a standby configuration in which all the objects in the set are in the passive state and a wake configuration in which all the objects in the set are in the active state, the change from the standby configuration to the wake configuration being implemented by the propagating, said propagated signal then being the wake instruction.

3. The method according to claim 1, wherein, when said radio tag of said object in the passive state receives said wake instruction, the method comprises authenticating the wake instruction by said radio tag with the aim of verifying that the wake instruction is indeed an authorized wake instruction, and if the wake instruction is authenticated, causing implementation of the supply of power to at least one reader of said object in the passive state, the change of said object to the active state, and the transmission, by said at least one powered reader, of the electromagnetic field with the aim of transmitting said wake instruction.

4. The method according to claim 1, wherein each object in the set has a plurality of communicating elements, each pair of neighbouring objects having two objects that are configured so as to communicate directly with one another solely by means of a single communicating element of one of the objects in the pair of neighbouring objects and a single communicating element of the other of the objects in the pair of neighbouring objects, and wherein the propagating of said signal includes a direct communication of the signal between said two objects in one and the same pair of neighbouring objects.

5. The method according to claim 4, wherein each communicating element has a reader and a radio tag, and wherein the supplying of power to a radio tag of one of the communicating elements of an object by a neighbouring object causes, in an event of reception of the wake instruction by said powered radio tag, the supply of power to each of the readers of the other communicating elements of said object.

6. The method according to claim 1, comprising generating a neighborhood inventory for the objects in the set from data generated by each of the objects in the set following reception of said signal, said inventory having, for each object in the set, a list comprising information relating to each object that is neighbouring said object.

7. The method according to claim 6, comprising using the data from the neighborhood inventory to generate mapping for a spatial arrangement of the objects in the set in relation to one another.

8. The method according to claim 7, comprising generating, for each object in the set, a communication path between the initial object and said object using a communication capabilities of at least one of (i) said initial object and (ii) at least one intermediate object situated on said communication path.

9. The method according to claim 8, comprising interrogating an object chosen among the set, the interrogating comprising:

transmitting an interrogation request from the initial object, said transmitted request propagating along the corresponding communication path until it reaches the chosen object, and responding to the request, said response being transmitted by the chosen object and propagating along the corresponding communication path as far as the initial object.

10. The method according to claim 6, wherein the generating of the inventory comprises a first object in the set drawing up a first list comprising information relating to each object that is neighbouring said first object.

11. The method according to claim 10, wherein the generating of the inventory includes a step of an enrichment of the inventory in which a second object transmits a second list, comprising information relating to each neighbouring object, to said first object, said first and second objects being neighbours, said first object enriching the inventory by including the first list of neighbouring objects that is associated with an identifier of said first object and the second list from the second object that is associated with an identifier of said second object.

12. The method according to claim 10, wherein the generating of the inventory includes enriching the inventory in which the first object transmits the first list to a second object, the second object being the one that transmitted said signal to the first object.

13. A storage installation comprising a set of communicating objects that are distributed that each object in the set of objects is neighbouring at least one other object in said set so as to form a pair of neighbouring objects that are configured so as to communicate with one another, said installation comprising elements that are configured so as to implement the method according to claim 1.

14. A communicating object intended to be stored in a storage installation comprising a set of communicating objects that are distributed such so that each object in the set of objects is neighbouring at least one other object in said set so as to form a pair of neighbouring objects that are configured so as to communicate with one another, said communicating objects being configured to implement a method comprising:

activating an initial object chosen among the objects in the set, and propagating, from the activated initial object, a signal to each of the other objects in the set, said propagation being configured so that each of said other objects in the set has received, at the end of the propagating, said signal from at least one neighbouring object belonging to said set at least once, wherein the propagated signal is a wake instruction, wherein, each of the objects in the set being in a passive state, a change from a passive state to an active state of the initial object is performed by the activating causing a supply of power to at least one reader of the initial object and a transmission of an electromagnetic field by said at least one reader for transmitting the wake instruction to a corresponding neighbouring object, and wherein the change from a passive state to an active state of each of the other objects in the set is performed by supplying power to a radio tag of said object in the passive state, said supply of power being caused by an electromagnetic field transmitted by a reader of a neighbouring object in the active state, said supply of power to the radio tag of said object in the passive state causing:

- a setup of a communication link between said reader of the neighbouring object in the active state and said radio tag of said object in the passive state,
- a transmission, via the communication link that has been set up, of the wake instruction by said reader of the neighbouring object in the active state, and
- a reception, by said radio tag of said object in the passive state, of said wake instruction causing the implementation of supplying power to at least one reader of said object in the passive state, its change to the active state, and a transmission, by said at least one powered reader, of an electromagnetic field with the aim of transmitting said wake instruction, wherein the communicating object comprises a plurality of communicating elements that are each disposed on different faces of the communicating object, and wherein each communicating element is configured to receive a signal and to transmit the signal to the other communicating elements on the communicating object, said other communicating elements being configured to propagate, following reception of said transmitted signal, said received signal to the outside of said communicating object.

15. The object according to claim 14, wherein each communicating element has:
- a reader configured to transmit an electromagnetic field allowing wireless powering of a radio tag of another communicating object, and
- a radio tag configured to be powered by the electromagnetic field transmitted by the reader of another communicating object.

16. The method according to claim 2, wherein, when said radio tag of said object in the passive state receives said wake instruction, the method comprises authenticating the wake instruction by said radio tag with the aim of verifying that the wake instruction is indeed an authorized wake instruction, and if the wake instruction is authenticated, causing implementation of the supply of power to at least one reader of said object in the passive state, the change of said object to the active state, and the transmission, by said at least one powered reader, of the electromagnetic field with the aim of transmitting said wake instruction.

17. The method according to claim 16, wherein each object in the set has a plurality of communicating elements, each pair of neighbouring objects having two objects that are configured so as to communicate directly with one another solely by means of a single communicating element of one of the objects in the pair of neighbouring objects and a single communicating element of the other of the objects in the pair of neighbouring objects, and wherein the propagating of said signal includes a direct communication of the signal between said two objects in one and the same pair of neighbouring objects.

18. The method according to claim 2, wherein each object in the set has a plurality of communicating elements, each pair of neighbouring objects having two objects that are configured so as to communicate directly with one another solely by means of a single communicating element of one of the objects in the pair of neighbouring objects and a single communicating element of the other of the objects in the pair of neighbouring objects, and wherein the propagating of said signal includes a direct communication of the signal between said two objects in one and the same pair of neighbouring objects.

19. The method according to claim 7, wherein the generating of the inventory comprises a first object in the set drawing up a first list comprising information relating to each object that is neighbouring said first object.

20. The method according to claim 19, wherein the generating of the inventory includes an enrichment of the inventory in which a second object transmits a second list, comprising information relating to each neighbouring object, to said first object, said first and second objects being neighbours, said first object enriching the inventory by including the first list of neighbouring objects that is associated with an identifier of said first object and the second list from the second object that is associated with an identifier of said second object.

* * * * *